(12) United States Patent
Hugh

(10) Patent No.: US 10,549,669 B2
(45) Date of Patent: Feb. 4, 2020

(54) ACTUATOR

(71) Applicant: Acro Aircraft Seating Limited, Crawley, West Sussex (GB)

(72) Inventor: Toby Hugh, Redhill (GB)

(73) Assignee: ACRO AIRCRAFT SEATING LIMITED (GB)

(*) Notice: Subject to any disclaimer, the term of this patent is extended or adjusted under 35 U.S.C. 154(b) by 0 days.

(21) Appl. No.: 15/942,048

(22) Filed: Mar. 30, 2018

(65) Prior Publication Data

US 2018/0281650 A1  Oct. 4, 2018

(30) Foreign Application Priority Data

Mar. 31, 2017  (GB) .................................. 1705188.9

(51) Int. Cl.
| | |
|---|---|
| *B64D 11/06* | (2006.01) |
| *F16C 1/10* | (2006.01) |
| *F16C 1/18* | (2006.01) |
| *G05G 1/04* | (2006.01) |
| *B60N 2/90* | (2018.01) |

(52) U.S. Cl.
CPC ............ *B60N 2/919* (2018.02); *B64D 11/064* (2014.12); *F16C 1/10* (2013.01); *F16C 1/18* (2013.01); *G05G 1/04* (2013.01)

(58) Field of Classification Search
CPC ...... F16C 1/16; F16C 1/18; F16C 1/14; F16C 1/145; F16C 1/10; F16C 1/101; F16C 1/102; F16C 1/103; F16C 1/105; F16C 1/106; G05G 1/04
See application file for complete search history.

(56) References Cited

U.S. PATENT DOCUMENTS

| | | | |
|---|---|---|---|
| 2,579,305 A | 12/1951 | Cushman | |
| 2,833,336 A | 5/1958 | McGregor | |
| 2,998,281 A | 8/1961 | Stoner et al. | |
| 3,355,963 A * | 12/1967 | Barton ..................... | F16C 1/16 74/422 |
| 3,762,766 A | 10/1973 | Barecki et al. | |
| 4,640,142 A * | 2/1987 | Cummins ................. | B60R 1/06 248/476 |
| 6,070,487 A * | 6/2000 | Beugelsdyk ............. | F16C 1/18 74/502.2 |
| 6,305,238 B1 * | 10/2001 | Gabas ..................... | B60T 11/04 403/13 |
| 7,182,402 B1 * | 2/2007 | Ahad ....................... | B60N 2/22 297/354.12 |

(Continued)

FOREIGN PATENT DOCUMENTS

JP  2014218125 A  11/2014

OTHER PUBLICATIONS

Combined Search and Examination Report for Application No. GB1705188.9 dated Sep. 29, 2017.

(Continued)

*Primary Examiner* — Timothy J Brindley

(74) *Attorney, Agent, or Firm* — Blank Rome LLP

(57) ABSTRACT

Described is an actuator for a recline mechanism. The actuator comprises (i) a connector for connecting the actuator to an elongate frame member adjacent to a seat base cushion of an aircraft seat; (ii) a housing; and (iii) a trigger for pulling a cable. Also described is an aircraft seat comprising the actuator and row of said seats.

17 Claims, 6 Drawing Sheets

(56) References Cited

U.S. PATENT DOCUMENTS

| | | | | |
|---|---|---|---|---|
| 7,303,236 B2* | 12/2007 | Ritter | ...................... | B60N 2/075 |
| | | | | 248/429 |
| 8,621,956 B2* | 1/2014 | Simeonidis | ............ | B60N 2/123 |
| | | | | 297/378.13 |
| 9,271,573 B2* | 3/2016 | Su | .......................... | A47C 1/032 |
| 10,021,982 B2* | 7/2018 | Mezzera | ................ | A47C 4/028 |
| 2004/0145225 A1 | 7/2004 | Alter | | |
| 2008/0245177 A1* | 10/2008 | Feng | ...................... | B62K 23/04 |
| | | | | 74/502.2 |
| 2009/0178265 A1* | 7/2009 | Wojcik | ................. | H01R 13/506 |
| | | | | 29/426.5 |
| 2011/0239810 A1* | 10/2011 | Wu | ........................ | A47C 1/023 |
| | | | | 74/502.2 |
| 2013/0200678 A1* | 8/2013 | Hirokawa | ............ | B60N 2/0296 |
| | | | | 297/378.13 |
| 2015/0232148 A1* | 8/2015 | Shirai | .................... | B62K 23/04 |
| | | | | 74/505 |
| 2016/0122022 A1* | 5/2016 | Cooke | ....................... | B64C 1/18 |
| | | | | 244/118.6 |
| 2016/0229481 A1* | 8/2016 | Shirai | .................... | B62K 23/02 |
| 2017/0015422 A1 | 1/2017 | Garing | | |
| 2017/0050734 A1 | 2/2017 | Becker et al. | | |
| 2018/0229805 A1* | 8/2018 | Minto | .................... | B62M 9/134 |

OTHER PUBLICATIONS

Extended European Search Report for EP18164541.7 dated Jun. 20, 2018.

* cited by examiner

ACTUATOR

CROSS-REFERENCE TO RELATED APPLICATIONS

This application is related to and claims the benefit of Great Britain Patent Application No. 1705188.9, entitled "Actuator", filed Mar. 31, 2017, the contents of which are incorporated herein by reference.

BACKGROUND OF THE INVENTION

Field of the Invention

The present invention relates to actuators for recline mechanisms, in particular for those used in aircraft seats.

Description of Related Art

It is known to provide aircraft seats with recline mechanisms in order to allow a passenger to recline the seat back into a more relaxing position. Typically, recline mechanisms include a hydraulic locking device, also known as a hydraulic lock or hydraulic seat recline device, such as a Hydrolok® hydraulic seat recline device, which is positioned under the seat.

The hydraulic locking device, which comprises a hydraulic piston and cylinder assembly, controls movement of the seat back and is typically connected to an actuator button in the side of the armrest by a cable. When the button is pressed, the cable is pulled, which releases the hydraulic locking device and allows movement of the seat back. Whilst the position of the seat back is biased toward an upright position, release of the hydraulic locking device also allows a passenger to recline the seat back. When the button is released, movement of the hydraulic locking device is prevented and the seat back remains static in the desired position. To return the seat back to an upright position, the button is pressed and the seat back is allowed to straighten to its original position.

Whilst recline mechanisms of the type described above have been in use for many years, they suffer from various problems. One such problem arises when the cable stretches. Over time, continued use of the recline mechanism causes the cable to stretch. Due to the short distance moved by the button, if the cable stretches by more than about 5 mm, the button becomes ineffective at pulling, i.e. displacing, the cable a sufficient distant to release the hydraulic lock. As a result, approximately 10% of reclining aircraft seats have inoperable recline buttons. This causes further problems because a passenger will tend to press the button harder to try and release the hydraulic lock, which will often result in damage to the button. Accordingly, not only does the cable require replacement, but the button will also require replacement.

It is, therefore, an object of the present invention to seek to alleviate the above identified problems.

BRIEF SUMMARY OF THE INVENTION

According to one aspect of the present invention, there is provided an actuator for a recline mechanism, the actuator comprising:—
  (i) a connector for connecting the actuator to an elongate frame member adjacent to a seat base cushion of an aircraft seat;
  (ii) a housing; and
  (iii) a trigger for pulling a cable.

Remarkably, the present invention provides a significantly improved actuator for a recline mechanism, which does not suffer from the problems of known actuators. In this respect, by positioning the actuator adjacent to a seat base cushion of an aircraft seat, a much shorter cable is required compared with the traditional location of the actuator in the arm rest. This means that, even if the cable does stretch, the increase in overall length of the cable is much less than for a longer cable. The present invention also provides ergonomic advantages over known actuators.

Preferably, the connector is removably attached to the housing. This is advantageous because it means that, in the event the housing is damaged, it can easily be replaced.

Preferably, the position of the housing relative to the connector is adjustable.

Preferably, when the connector is connected to an elongate frame member of an aircraft seat, the position of the housing along the elongate frame member is adjustable. The provision of such lateral adjustment allows the position of the housing to be altered to accommodate seat base cushions of different sizes or configurations.

Preferably, the connector comprises a two-piece clamp.

Preferably, the connector is releasable from an elongate frame member of an aircraft seat by a single releasable lock.

Preferably, the connector is releasable from an elongate frame member of an aircraft seat via a single bolt.

Preferably, the housing is shaped to correspond to the shape of a seat base cushion.

Preferably, when attached to an elongate frame member of an aircraft seat, the housing, and preferably also the trigger, does not protrude above or forward of an adjacent seat base cushion of the aircraft seat.

Preferably, when attached to a elongate frame member of an aircraft seat, the housing is sized such that its upper surface is lower than the upper surface of an adjacent seat base cushion when viewed from the side and such that its forward facing surface is set rearward of the forward facing surface of an adjacent seat base cushion when viewed from the side.

Preferably, the outer profile of the housing is curved.

Preferably, the housing has a curved forward facing surface.

The shape and position of the housing relative to an adjacent seat base cushion is advantageous because it reduces the risk of false activation of the trigger as a passenger locates themselves in an aircraft seat.

Preferably, when viewed from above, a seat base cushion-facing side of the housing is tapered, having a larger width at or near a forward-facing edge of the housing and a smaller width at or near a rear-facing edge of the housing.

Remarkably, the provision of a tapered housing helps to prevent forward movement of a seat base cushion when the housing is placed next to the seat base cushion.

Preferably, the housing is shaped to fit against a shaped profile of a seat base cushion.

Preferably, the trigger is positioned on the housing.

Preferably, the trigger is a sliding trigger.

Remarkable, the provision of a sliding trigger, instead of a push button, means that sliding movement of the trigger can pull the cable a much greater distance than by pushing a button. Combined with the location of the actuator much closer to the recline mechanism, which means a shorter cable is required, the increased movement of the cable by the actuator means that failure of the actuator due to cable stretch is significantly reduced, if not completely prevented.

Preferably, the trigger is slideable relative to the housing.

Preferably, the trigger is slideable along the outer surface of the housing.

Preferably, the trigger is shaped to follow the contours of the outer surface of the housing.

Preferably, the trigger is curved to follow the contours of the outer surface of the housing.

Preferably, the trigger is slideable forward from a position on the upper surface of the housing.

Preferably, the trigger is slideable forward from a position on the upper surface of the housing to a position on the forward facing surface of the housing.

Alternatively, or in addition, the trigger is slideable rearward to or from a position on the upper surface of the housing.

Preferably, the trigger is slideable rearward from a position on the forward facing surface of the housing to a position on the upper surface of the housing.

Preferably, the trigger is slideable in a first direction to pull a first cable and in a second direction to pull a second cable.

Preferably, forward movement of the trigger is for pulling a first cable and rearward movement of the trigger is for pulling a second cable.

Preferably, forward movement of the trigger pulls a first cable and rearward movement of the trigger pulls a second cable.

Preferably, the first cable is connectable to a first control mechanism for controlling movement of a first part of a seat, preferably a vehicle seat and the second cable is connectable to a second control mechanism for controlling movement of a second part of a seat, preferably a vehicle seat.

Preferably, the first and/or second control mechanism comprises a hydraulic piston and cylinder assembly.

Preferably, the first and/or second control mechanism comprises a recline mechanism.

Preferably, the first part of a seat comprises a seat back, a foot rest and/or a leg rest.

Preferably, the second part of a seat comprises a seat back, a foot rest and/or a leg rest.

In particularly preferred embodiment, movement of the trigger in a first direction controls movement of a seat back and movement of the trigger in a second direction controls movement of a leg rest.

Preferably, the trigger is a low profile trigger.

Preferably, the trigger comprises a plate.

Preferably, the trigger comprises a curved plate.

Preferably, the width of the trigger is tapered from a greater width at or near a forward facing end of the trigger to a lesser width at or near a reward facing end of the trigger.

This is particularly advantageous, because when a grip is provided towards the forward end of the trigger, the increased width of the trigger in this area not only provides a larger area to be gripped by the finger/s of a passenger, but also provides additional strength.

Preferably, the trigger comprises a grip.

Preferably, the grip comprises one or more protrusions.

Preferably, the grip comprises one or more ridges.

Preferably, the grip is provided at or near a forward or rearward end of the trigger.

Preferably, the grip is provided in or on an upper surface of the trigger.

Preferably, the trigger is biased to a non-actuated position.

Preferably, the trigger is biased to a rearward or forward position, for example on an upper surface of the housing.

Preferably, the trigger is biased by a spring, for example by a torsion spring.

Preferably, the trigger is connected to a rotating member/rotor within the housing.

Preferably the rotating member/rotor comprises one or more attachment means for connection to one or more cables of a control mechanism, preferably a recline mechanism.

As will be appreciated, when the trigger is moved relating to the housing, the rotating member rotates and pulls the cable into the housing. This in turn actuates a recline mechanism attached to the seat back of the aircraft seat. When the trigger is released, it returns to an "at rest" position locking the recline mechanism in position.

Preferably, the rotating member/rotor abuts an abutment/location surface. This provides for smooth and predictable movement of the rotating member/rotor and thus the trigger.

Preferably, the abutment surface is an O-ring.

Preferably, the abutment surface is a low friction surface.

Preferably, the abutment surface is a silicone abutment surface, for example a silicone O-ring.

Preferably, the rotating member/rotor is biased into abutment with the abutment surface.

Preferably, the rotating member/rotor is biased into abutment with the abutment surface by a spring, for example a wave spring.

Preferably, the actuator comprises a cable for connection to a control mechanism, preferably a recline mechanism.

Preferably, the control mechanism, preferably a recline mechanism, comprises a hydraulic piston and cylinder assembly.

Preferably, the control mechanism, preferably a recline mechanism, comprises a hydraulic locking device, for example a hydraulic seat recline device, such as a Hydrolok® hydraulic seat recline device.

Preferably, the actuator comprises a cable for connection to a control mechanism for controlling movement of a part of a seat, preferably a vehicle seat.

Preferably, the control mechanism comprises a hydraulic piston and cylinder assembly.

Preferably, the part of a seat comprises a seat back, a foot rest and/or a leg rest.

According to another aspect of the present invention, there is provided an aircraft seat comprising an actuator as described herein and a recline mechanism.

Preferably, the actuator is positioned adjacent a seat base cushion of the aircraft seat.

Preferably, the actuator is positioned on a window side of the aircraft seat.

According to another aspect of the present invention, there is provided a row of aircraft seats comprising one or more actuators as described herein and one or more recline mechanisms.

Preferably, the one or more actuators are positioned adjacent a seat base cushion of the aircraft seat.

Preferably, the one or more actuators are positioned on a window side of the aircraft seat.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

It will be appreciated that reference to "one or more" includes reference to "a plurality".

BRIEF DESCRIPTION OF THE DRAWINGS

Example embodiments of the present invention will now be described with reference to the accompanying Figures, in which:—

DETAILED DESCRIPTION OF THE INVENTION

Figure 1A:
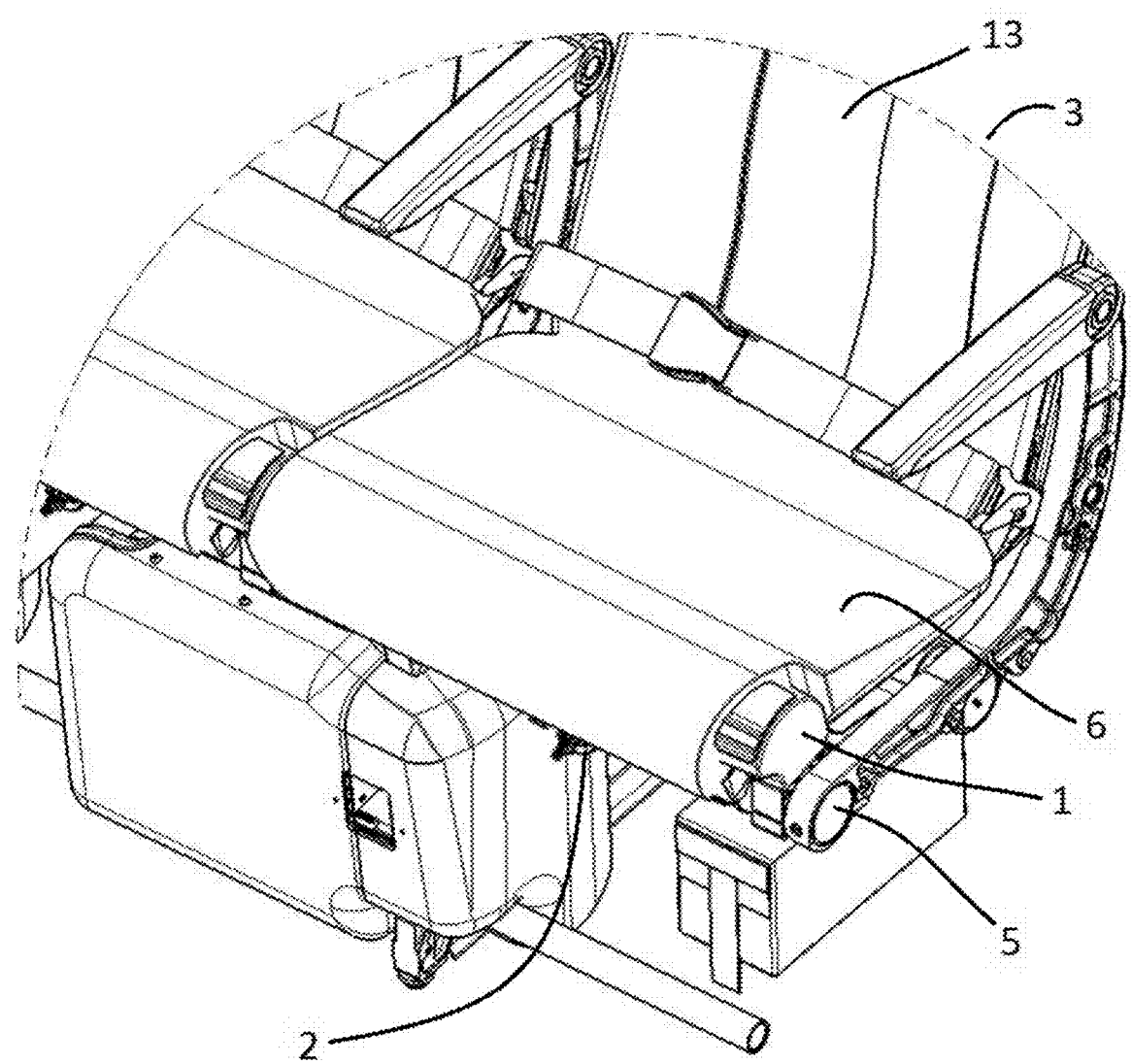
FIGS. 1A and 1B show an actuator of the present invention positioned adjacent an aircraft seat base cushion.
Figure 1B:
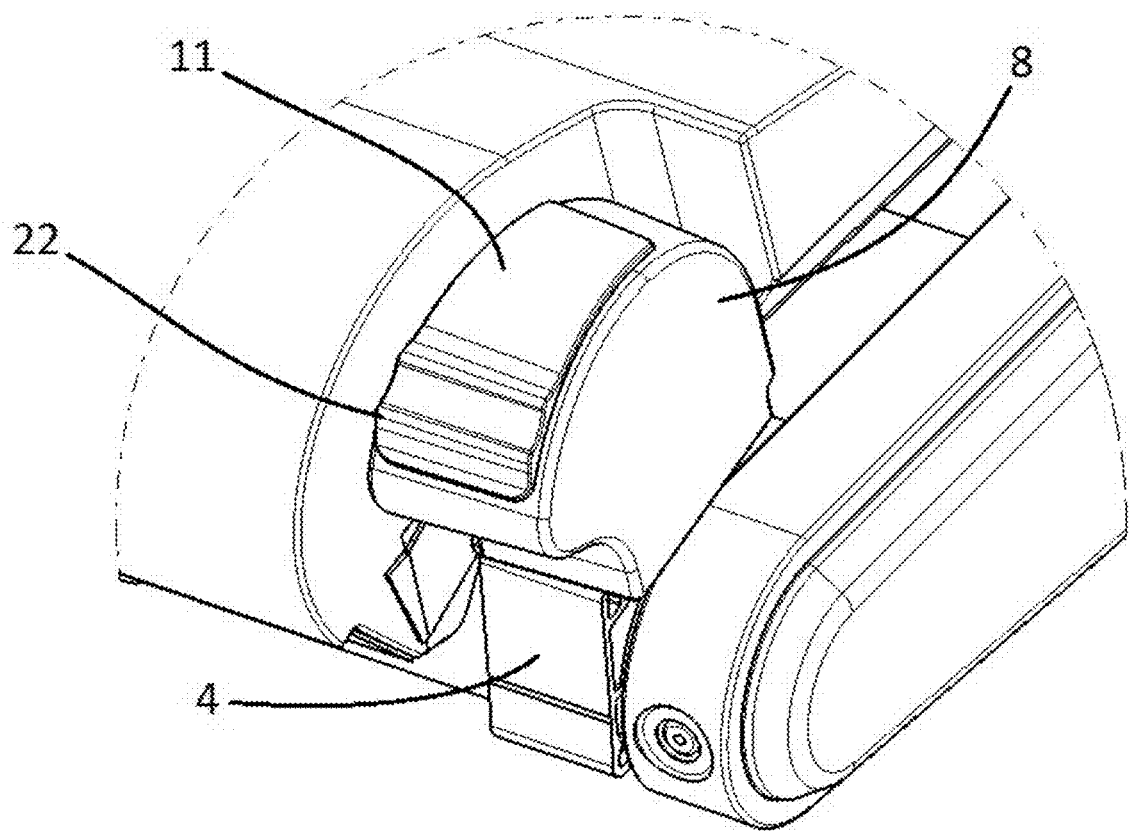

The present invention relates to actuators for recline mechanisms, in particular for those used in aircraft seats.

With reference to the Figures, an actuator 1 is provided for a recline mechanism 2 of an aircraft seat 3. In the example shown, the recline mechanism is a Hydrolok® hydraulic seat recline device.

With particular reference to the Figures, the actuator 1 comprises a connector 4 for connecting the actuator 1 to an elongate frame member 5 adjacent to a seat base cushion 6 of the aircraft seat 3. In the example shown, the connector 4 comprises a two piece 4a, 4b clamp, which is secured to the frame 5 by a single bolt 7. This, therefore, allows for easy removal of the actuator 1 for maintenance, adjustment or replacement.

The connected 4 is attached to a housing 8 by bolts 9. The bolts 9 are moveable within slots 10, thus allowing for adjustment of the position of the housing along the elongate frame member 5 of the seat 3. The provision of bolts 9 also means that the housing 8 can be removed from the connector 4 for replacement or repair.

Figure 5:
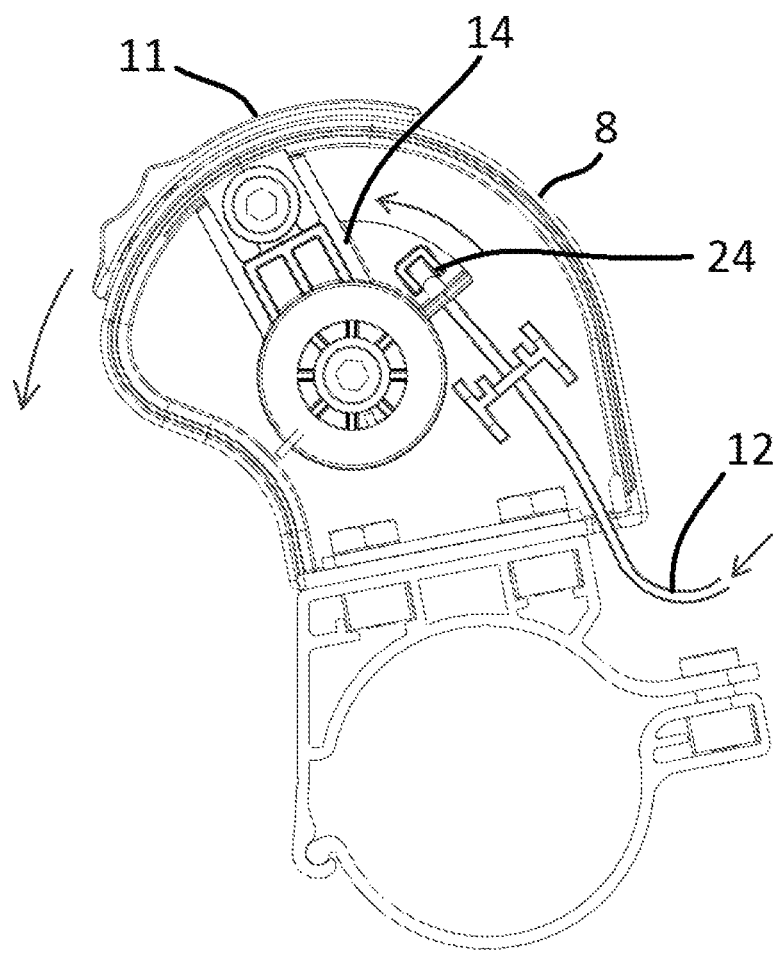
FIG. 5 shows an internal view of the actuator housing.

A trigger 11 is provided on an upper surface of the housing 8 and is slideable in a forward direction (with reference to the direction of the seat) on the surface of the housing 8, to pull a cable 12 and thus release the recline mechanism 2 and, therefore, allow movement of the seat back 13. It is understood that, reference to "pull" a cable 12, means that the cable 12 is displaced. Movement of the cable 12 and trigger 11 is shown with particular reference to FIG. 5 from which it will be seen that the trigger 11 is connected to a rotating member, or rotor, 14 which is connected to the cable 12 via an attachment means 24 such that movement of the trigger 11 causes rotation of the rotating member 14 and pulling of the cable 12. This in turn actuates the recline mechanism 2. When the trigger 11 is released, it returns to an "at rest" position locking the recline mechanism 2, and thus the seat back 13, in position.

Whilst not specifically shown in the Figures, the trigger 11 can be configured to also pull a second cable (not shown) when the trigger 11 is moved in a rearward direction (with reference to the direction of the seat) and thus release a second control mechanism, for example a hydraulic piston and cylinder assembly, which controls movement of a second part of a seat, for example movement of a leg rest.

Remarkably, the present invention provides a significantly improved actuator for a recline mechanism, which does not suffer from the problems of known actuators. In this respect, by positioning the actuator adjacent to a seat base cushion of an aircraft seat, a much shorter cable is required than compared with the traditional location of the actuator in the arm rest. For example, when provided in an arm rest, the cable is usually about 100 cm in length, whilst the actuator of the present invention allows for a much shorter cable, for example of about 40 to 60 cm in length. This means that, even if the cable does stretch, the increase in overall length of the cable is much less than for a longer cable.

In addition, the provision of a sliding trigger 11, instead of a push button, means that sliding movement of the trigger 11 can pull/displace the cable 12 a much greater distance than by pushing a button. Combined with the location of the actuator much closer to the recline mechanism 2, which means a shorter cable is required, the increased movement of the cable 12 by the actuator is such that failure of the actuator due to cable stretch is significantly reduced, if not completely prevented.

Figure 3:
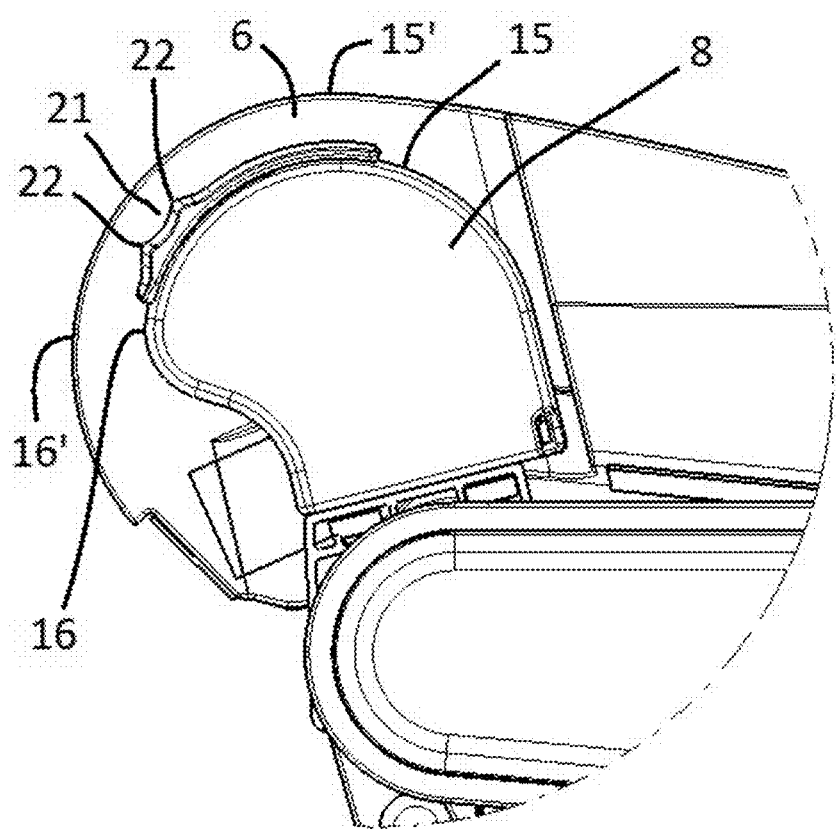
FIG. 3 shows a side view of the actuator.

As shown in FIG. 3, the housing 8 is curved to correspond to the shape of the seat base cushion 6. In addition, when viewed from the side, the housing 8 is sized such that its upper surface 15 is lower than the upper surface 15' of an adjacent seat base cushion 6 and such that its forward facing surface 16 is set rearward of the forward facing surface 16' of the adjacent seat base cushion.

The shape and position of the housing 8 relative to the seat base cushion 6 is advantageous because it reduces the risk of false activation of the trigger 11 as a passenger locates themselves in the aircraft seat 3.

Figure 2:
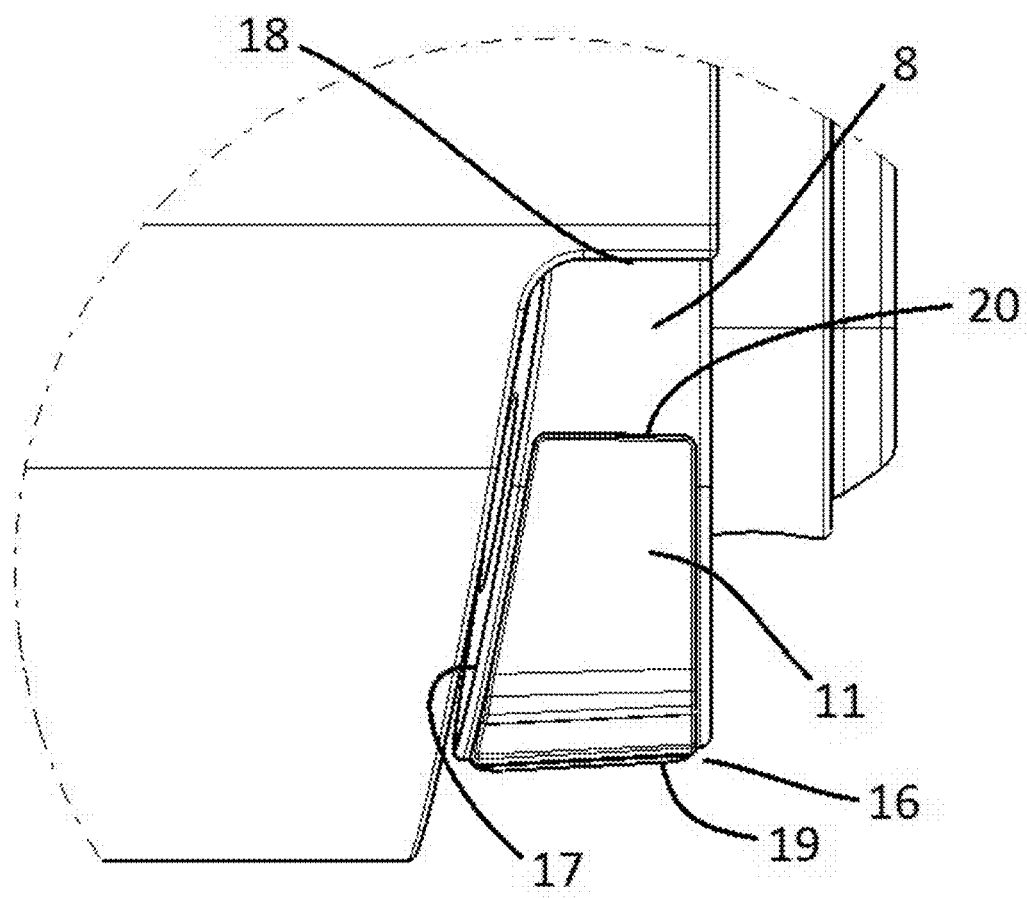
FIG. 2 shows a view from above the actuator.

With reference to FIG. 2, when viewed from above, a seat base cushion-facing side 17 of the housing 8 is tapered from a larger width at or near a forward facing edge 16 of the housing 8 to a smaller width at or near a rear facing edge 18 of the housing 8. The provision of a tapered housing 8 helps to prevent forward movement of a seat base cushion 6 when the housing 8 is placed next to the seat base cushion 6. It will also be seen that the housing 8 is shaped to fit against a shaped profile of a seat base cushion 6. In the example shown, the shaped profile is created by a truncated corner of the seat base cushion 6.

In the example shown, the trigger 11 is a curved plate, which follows the contours of the outer surface of the housing 8 and is slideable forward from a position on the upper surface 15 of the housing to a position on the forward facing surface 16 of the housing. Whilst the trigger is slideable in a forward direction in the example shown, it will be appreciated that the trigger could be slideable in a rearward direction in other examples. It will further be appreciated that the trigger could be configured such that it is slideable in either a forward or rearward direction.

With particular reference to FIG. 2 the width of the trigger 11 is tapered from a greater width at or near a forward facing end 19 of the trigger to a lesser width at or near a rearward facing end 20 of the trigger 11. Referring to FIG. 3, a grip 21, in the form of a series of ridges 22, is provided towards the forward end 19 of the trigger 11. Accordingly, the increased width of the trigger 11 in this area not only provides a larger area to be gripped by the finger/s of a passenger, but also provides additional strength.

In the example shown, the trigger 11 is biased to a non-actuated, rearward position by a torsion spring 23.

Figure 4:
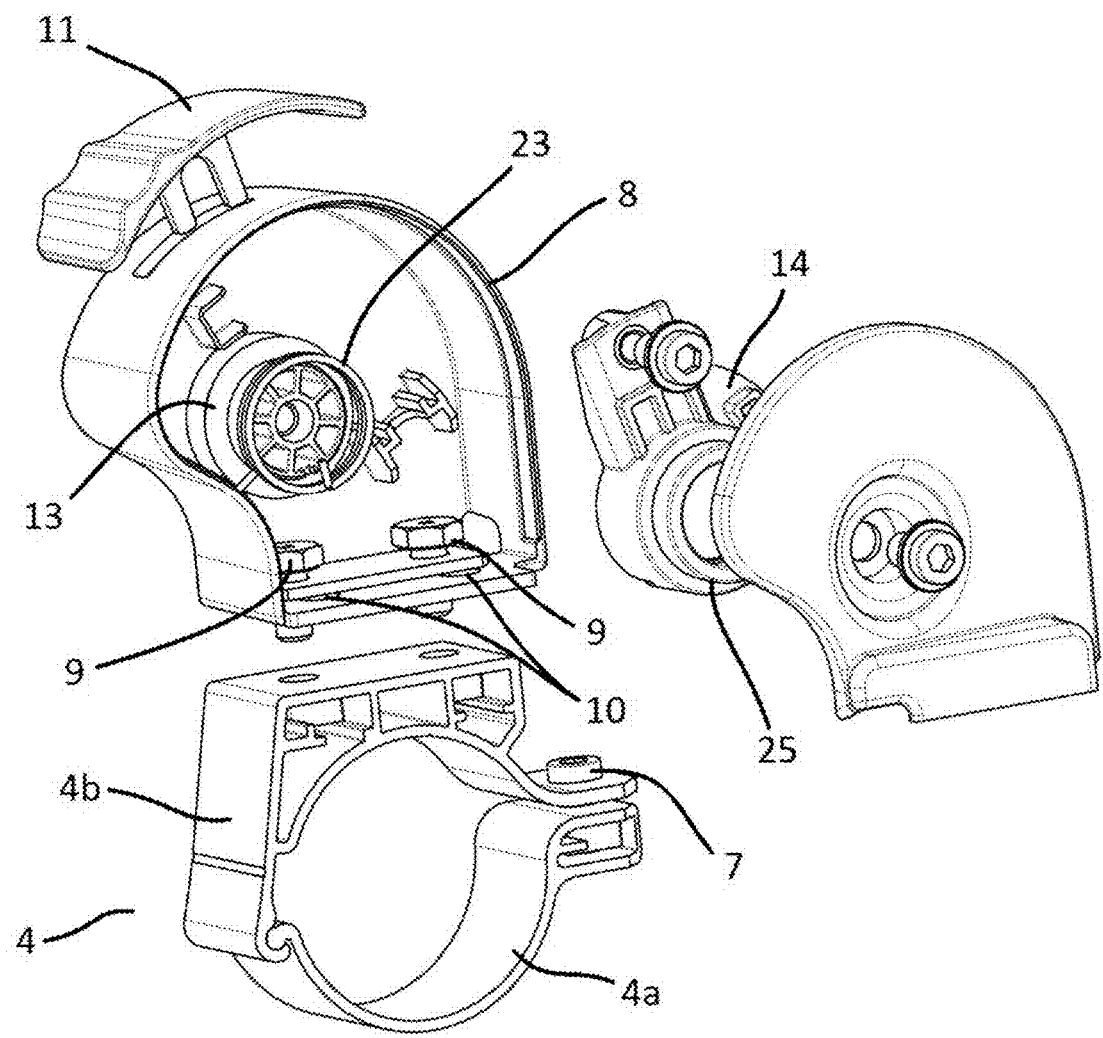
FIG. 4 shows an exploded view of the actuator.

As shown in FIG. 4, the rotating member 14 abuts a silicone O-ring 26 and is biased into abutment therewith by a wave spring 25. This provides for smooth and predictable movement of the rotating member 14 and thus also the trigger 11.

In order to minimise the risk of accidental actuation of the trigger 11, the actuator 1 is positioned on a window side of each aircraft seat 3.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications are covered by the appended claims.

I claim:

1. An actuator for a recline mechanism of an aircraft seat, the actuator comprising:
   (i) a connector for connecting the actuator to an elongate frame member adjacent to a seat base cushion of the aircraft seat;
   (ii) a housing; and
   (iii) a trigger for pulling a cable, wherein the trigger is slideable forward or rearward from a position on the upper surface of the housing.

2. An actuator according to claim 1, wherein the connector is removably attached to the housing.

3. An actuator according to claim 1, wherein the position of the housing relative to the connector is adjustable.

4. An actuator according to claim 1, wherein the connector is releasable from an elongate frame member of an aircraft seat by a single releasable lock.

5. An actuator according to claim 1, wherein the housing is shaped to correspond to the shape of a seat base cushion and wherein the trigger is shaped to follow the contours of the upper surface of the housing.

6. An actuator according to claim 1, wherein the outer profile of the housing is curved.

7. An actuator according to claim 1, wherein the housing has a curved forward facing surface.

8. An actuator according to claim 1, wherein when viewed from above, a seat base cushion-facing side of the housing is tapered, having a larger width at or near a forward-facing edge of the housing and a smaller width at or near a rear-facing edge of the housing.

9. An actuator according to claim 1, wherein the housing is shaped to fit against a shaped profile of a seat base cushion.

10. An actuator according to claim 1, wherein the trigger is a low profile trigger.

11. An actuator according to claim 1, wherein the width of the trigger is tapered from a greater width at or near a forward facing end of the trigger to a lesser width at or near a reward facing end of the trigger.

12. An actuator according to claim 1, wherein the trigger is connected to a rotating member or rotor within the housing and wherein the rotating member or rotor abuts an abutment surface.

13. An actuator according to claim 12, wherein the abutment surface is a low friction surface.

14. An actuator according to claim 12, wherein the rotating member or rotor is biased into abutment with the abutment surface.

15. An actuator according to claim 1, wherein the trigger is slideable in a first direction to pull a first cable and in a second direction to pull a second cable.

16. An aircraft seat comprising an actuator according to claim 1.

17. A row of aircraft seats comprising a plurality of aircraft seats according to claim 16.

* * * * *